United States Patent
Leszczyński

(10) Patent No.: US 12,305,526 B2
(45) Date of Patent: May 20, 2025

(54) SEAL SYSTEM USING LAYERS OF SEAL SEGMENTS FORCED INTO SEALING ENGAGEMENT USING TENSION CABLE

(71) Applicant: GE Infrastructure Technology LLC, Greenville, SC (US)

(72) Inventor: Karol Filip Leszczyński, Warsaw (PL)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/649,376

(22) Filed: Apr. 29, 2024

(65) Prior Publication Data

US 2024/0368994 A1   Nov. 7, 2024

(30) Foreign Application Priority Data

May 4, 2023   (PL) ........................................ 444739

(51) Int. Cl.
| | |
|---|---|
| *F01D 25/30* | (2006.01) |
| *F01D 11/00* | (2006.01) |
| *F02K 1/04* | (2006.01) |
| *F02K 1/08* | (2006.01) |
| *F02K 1/80* | (2006.01) |
| *F02K 1/82* | (2006.01) |

(52) U.S. Cl.
CPC ............ *F01D 25/30* (2013.01); *F01D 11/005* (2013.01); *F02K 1/04* (2013.01); *F02K 1/08* (2013.01); *F02K 1/085* (2013.01); *F02K 1/80* (2013.01); *F02K 1/805* (2013.01); *F02K 1/82* (2013.01); *F05D 2240/59* (2013.01); *F25J 2240/80* (2013.01); *F25J 2240/82* (2013.01)

(58) Field of Classification Search
CPC .......... F01D 25/30; F01D 11/005; F02K 1/04; F02K 1/08; F02K 1/085; F02K 1/80; F02K 1/805; F02K 1/82; F05D 2240/59; F25J 2240/80; F25J 2240/82
See application file for complete search history.

(56) References Cited

U.S. PATENT DOCUMENTS

| | | | | |
|---|---|---|---|---|
| 4,627,625 | A | * | 12/1986 | Johnson ................. F16J 15/363 277/627 |
| 5,474,305 | A | * | 12/1995 | Flower ................. F16J 15/3288 277/355 |
| 7,434,813 | B1 | * | 10/2008 | Franceschini ........ F16J 15/3292 277/355 |

(Continued)

*Primary Examiner* — Brian Christopher Delrue
(74) *Attorney, Agent, or Firm* — James Pemrick; Charlotte Wilson; Hoffman Warnick LLC

(57) ABSTRACT

A seal system for sealing a first component with a second component is provided. The seal system includes layers of abutting planar seal segments. A first seal element is in a slot in the first component to slidably seal against a surface of the layers, and a second seal element is on a surface of the second component and engages with the second end of certain layer(s). Members extend from seal segments of one of the layers and a tension cable engages the members. A tensioner is coupled to end(s) of the tension cable to apply a tension force on the tension cable to force the seal segments to slidably seal the second seal element with the surface of the second component. The abutting planar seal segments can move freely perpendicular and parallel to the second component and can thermally contract/expand as necessary.

15 Claims, 9 Drawing Sheets

(56) References Cited

U.S. PATENT DOCUMENTS

| | | | | |
|---|---|---|---|---|
| 7,976,026 | B2* | 7/2011 | Verma | F16J 15/3292 |
| | | | | 277/355 |
| 8,662,544 | B2* | 3/2014 | Broderick | F01N 13/1811 |
| | | | | 285/364 |
| 9,399,926 | B2* | 7/2016 | Wiebe | F02C 7/28 |
| 10,865,658 | B2* | 12/2020 | Hashimoto | F01D 25/246 |
| 11,174,747 | B2* | 11/2021 | Roy Thill | F01D 11/08 |
| 11,174,944 | B2* | 11/2021 | Franceschini | F01D 11/001 |
| 2012/0217372 | A1* | 8/2012 | Vauchel | B64D 29/06 |
| | | | | 403/338 |
| 2013/0043658 | A1* | 2/2013 | Zheng | F16J 15/3288 |
| | | | | 277/355 |
| 2014/0346741 | A1* | 11/2014 | Takagi | F02C 7/28 |
| | | | | 277/641 |
| 2015/0056068 | A1* | 2/2015 | Wiebe | F02C 7/28 |
| | | | | 415/173.1 |
| 2015/0143816 | A1* | 5/2015 | Salunkhe | F01D 25/162 |
| | | | | 415/108 |
| 2015/0204447 | A1* | 7/2015 | Kloepfer | F01D 9/041 |
| | | | | 277/306 |

* cited by examiner

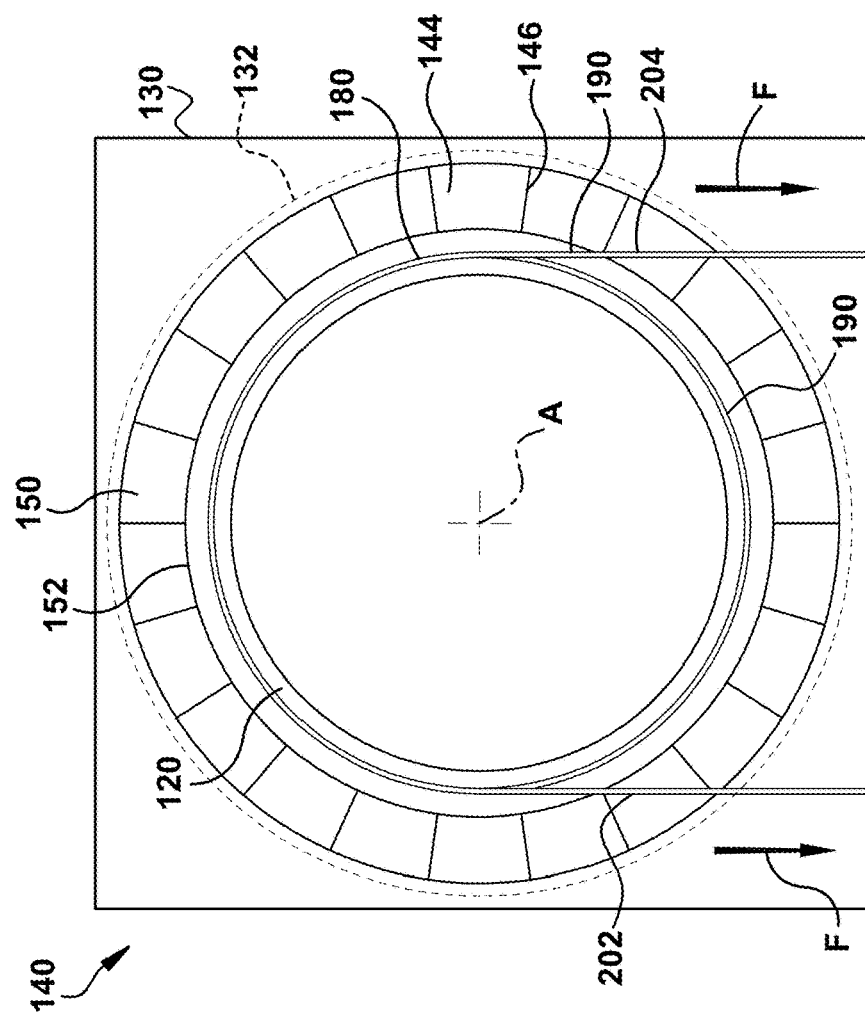
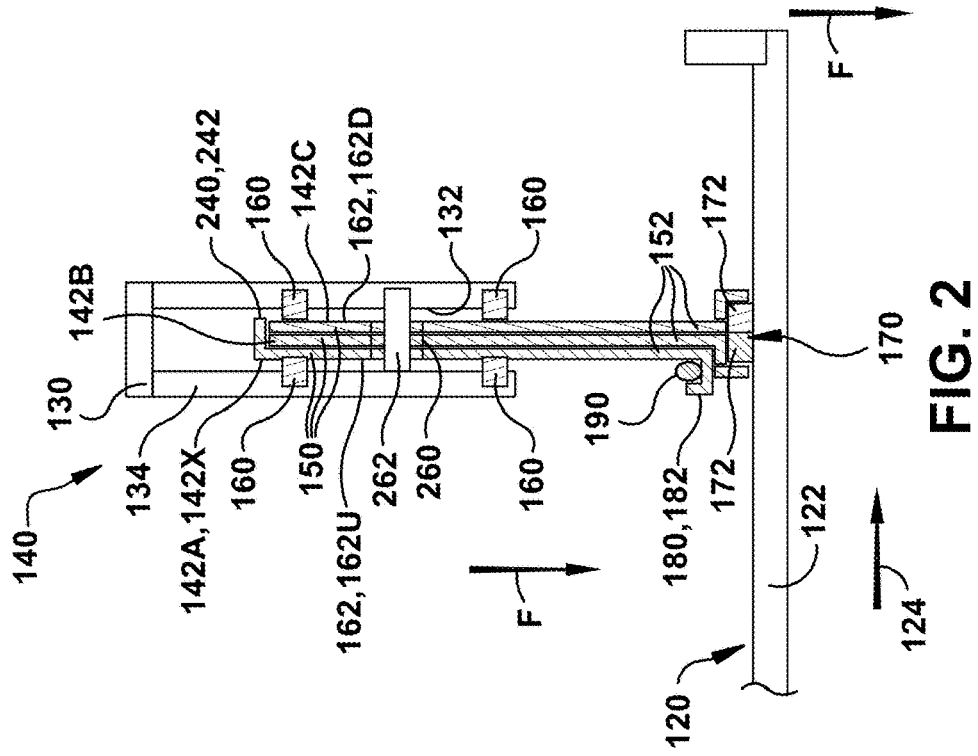

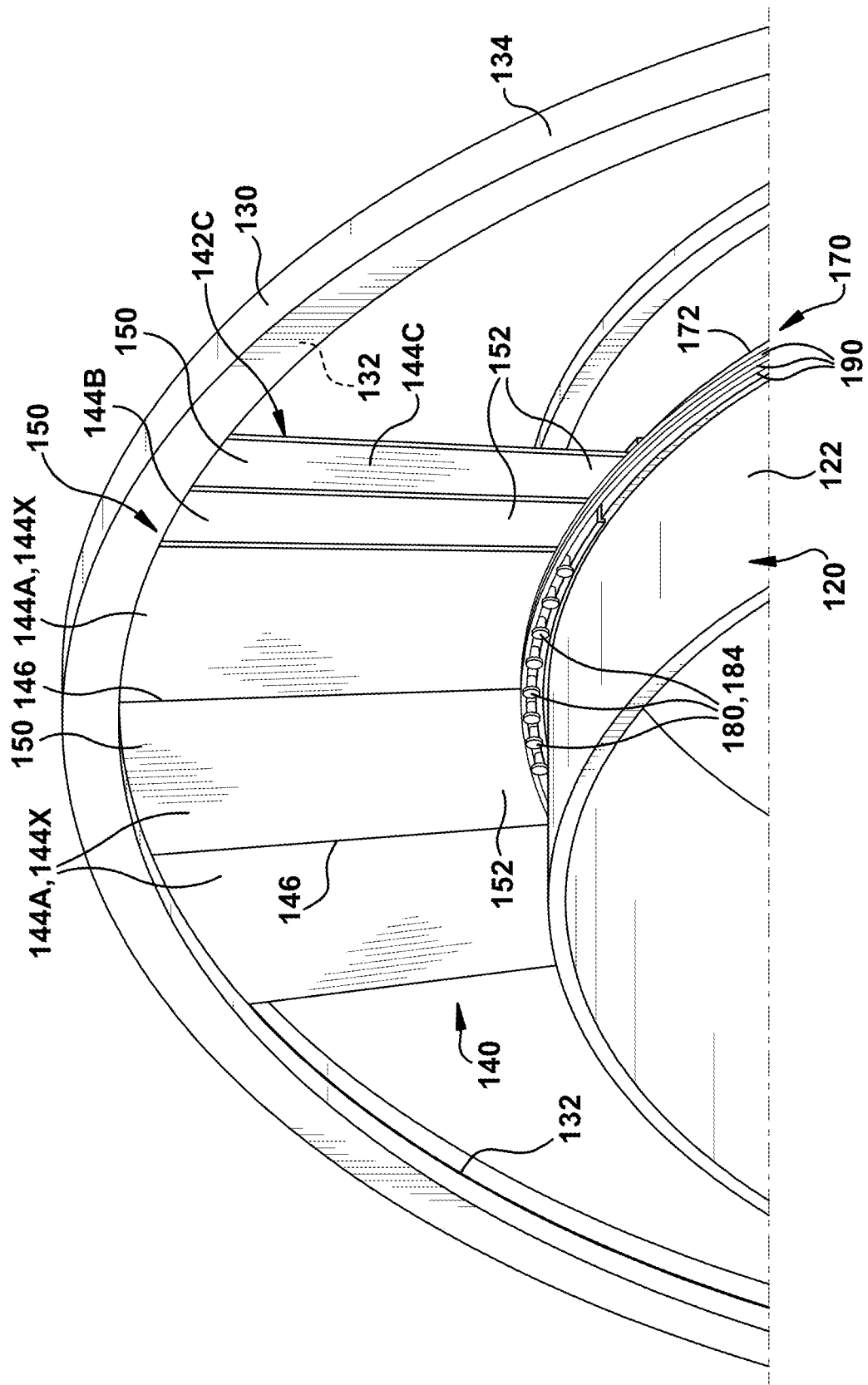

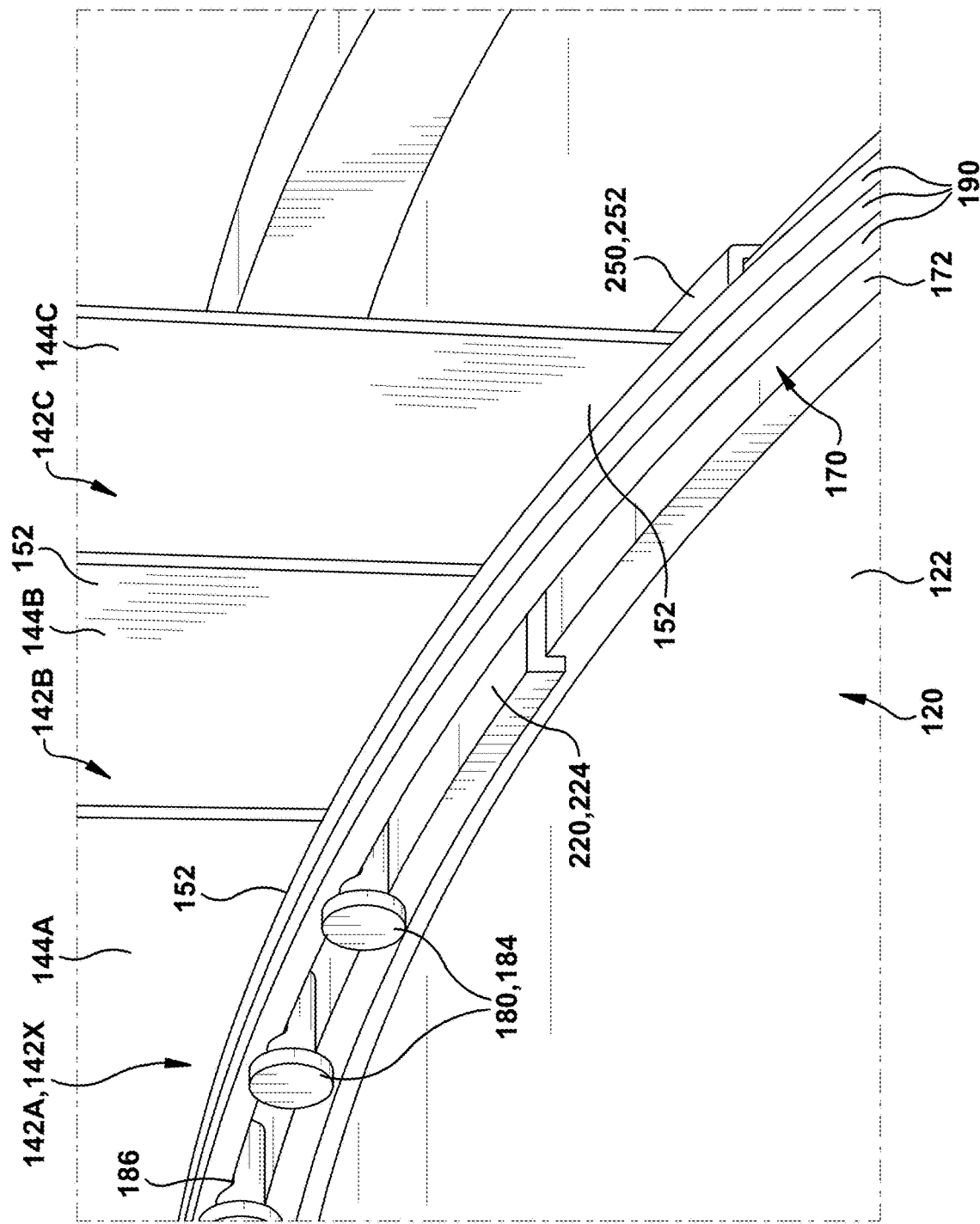

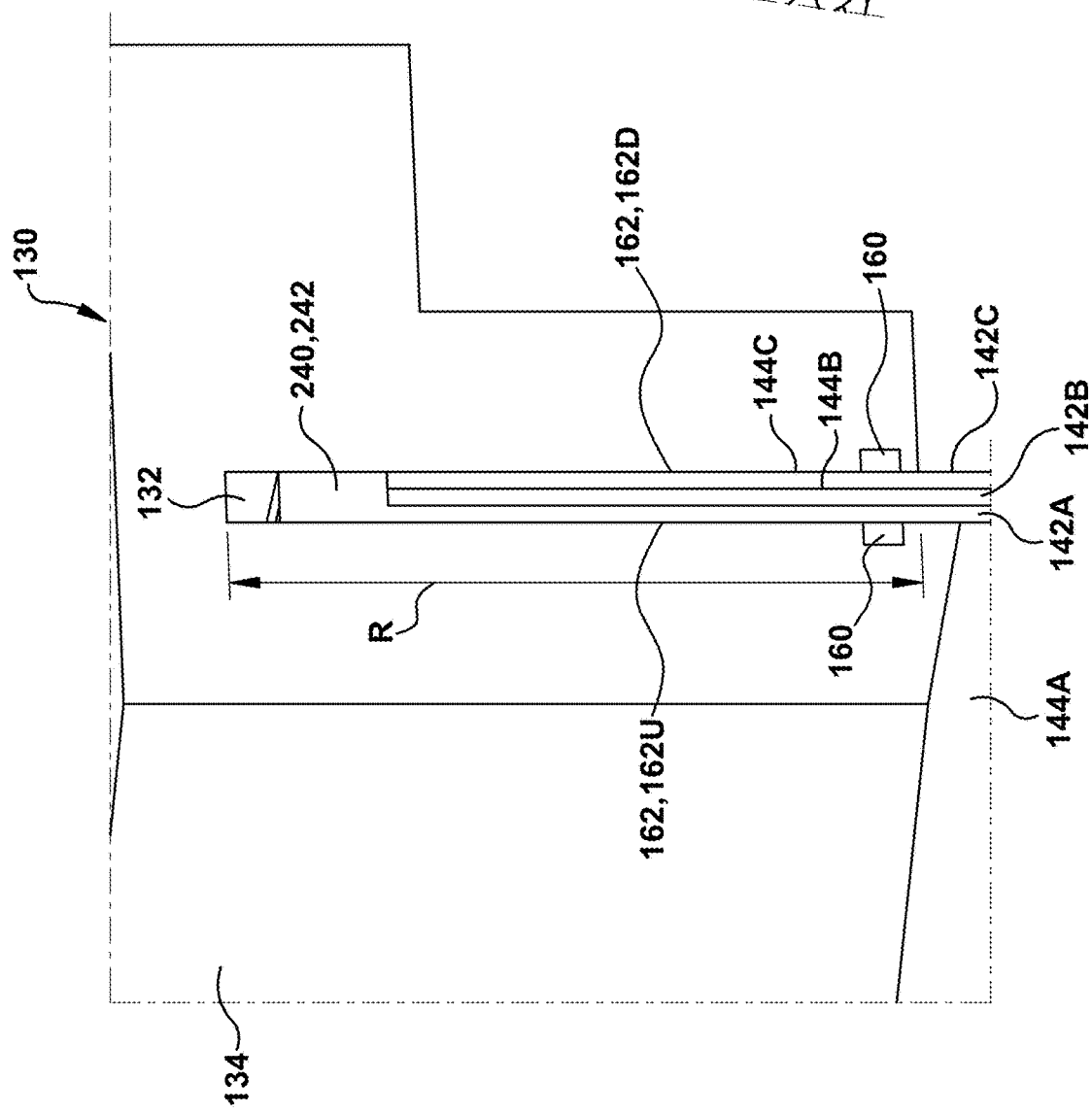

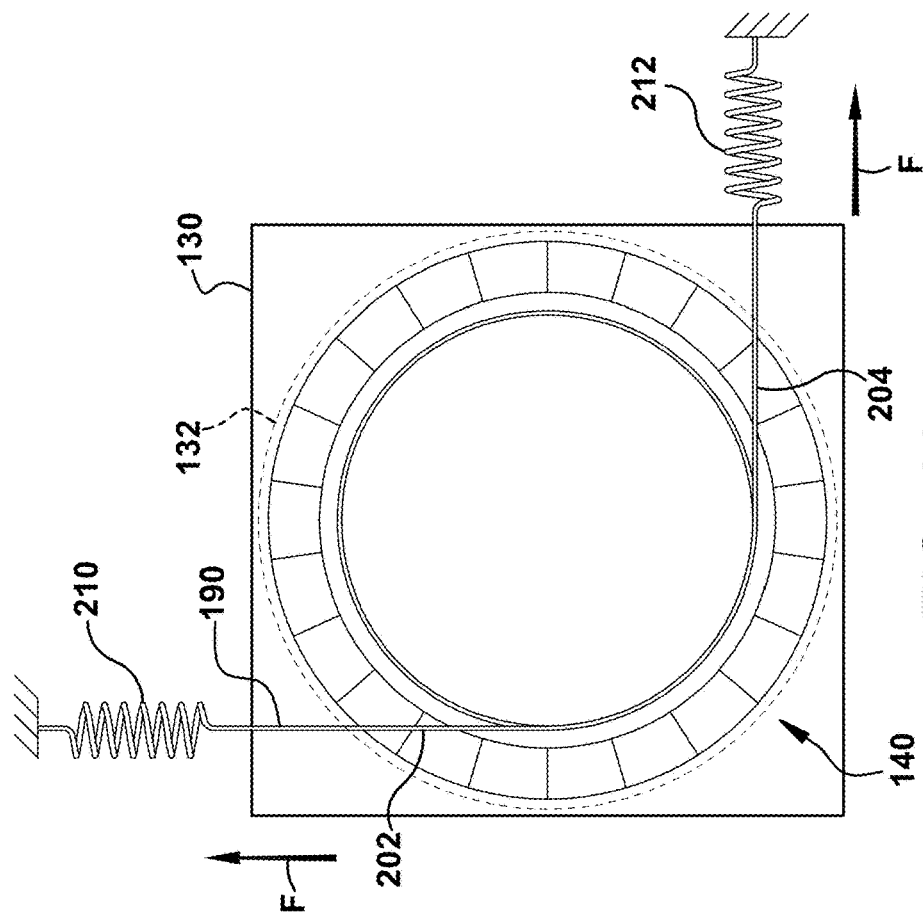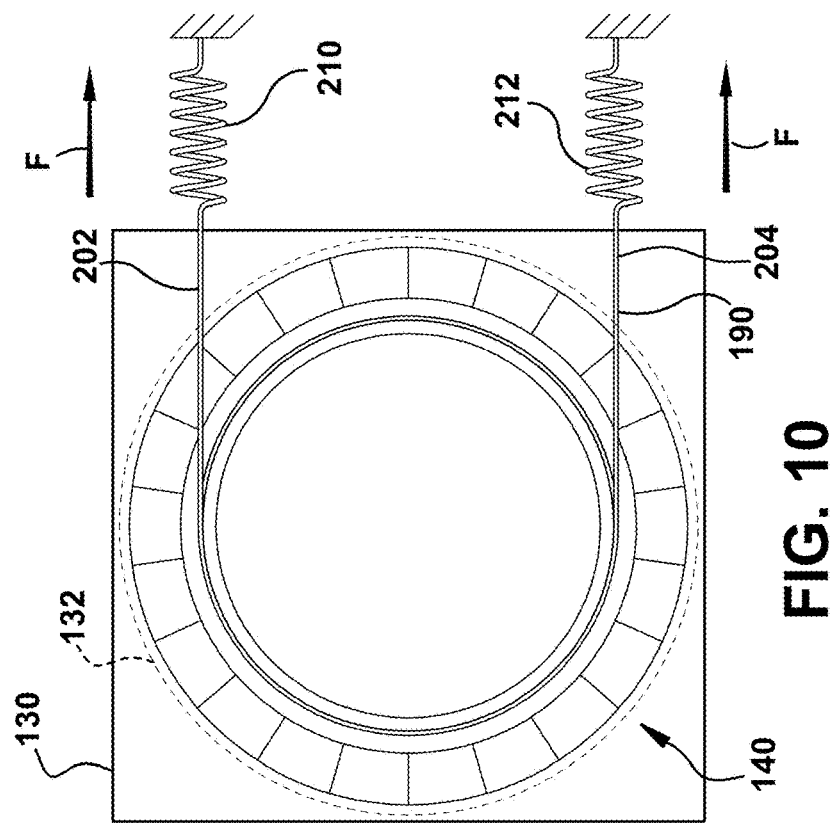

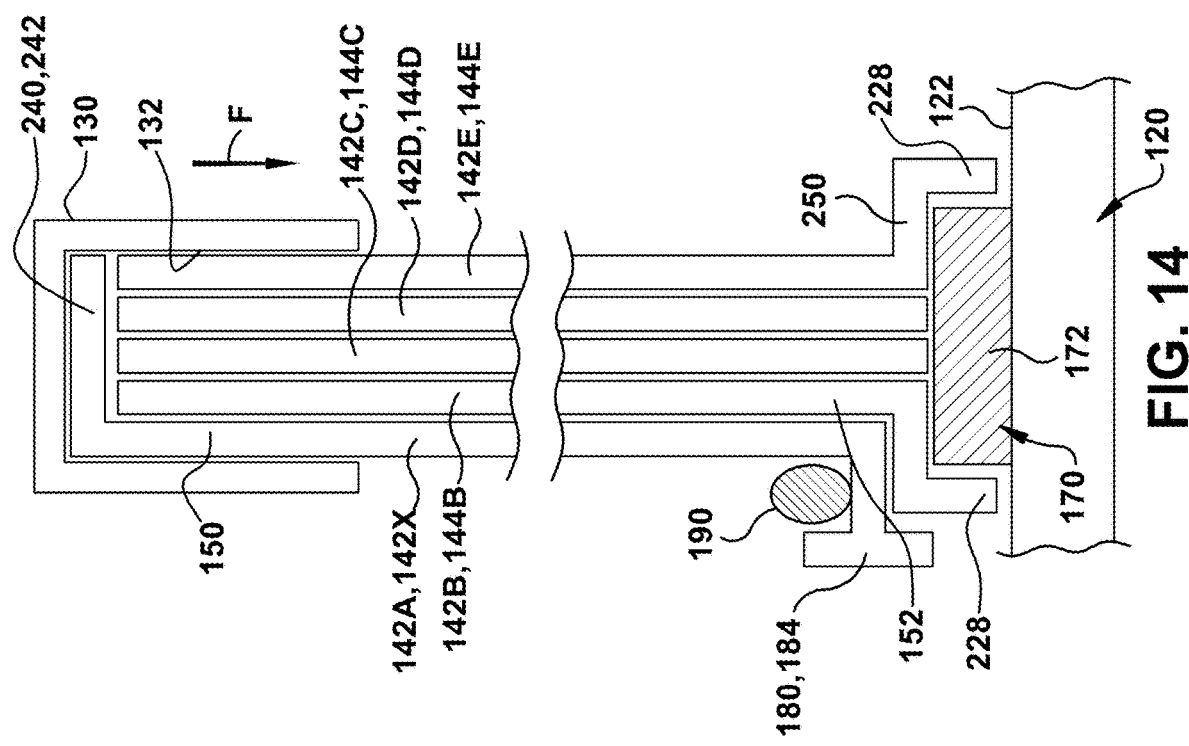

SEAL SYSTEM USING LAYERS OF SEAL SEGMENTS FORCED INTO SEALING ENGAGEMENT USING TENSION CABLE

CROSS-REFERENCE TO RELATED APPLICATIONS

This application claims priority pursuant to 35 U.S.C. 119(a) to Polish Application No. P.444739, filed May 4, 2023, which application is incorporated herein by reference in its entirety.

TECHNICAL FIELD

The disclosure relates generally to seal systems. More specifically, the disclosure relates to a seal system including layers of abutting planar seal segments forced into sealing engagement with a tension cable.

BACKGROUND

Certain components in industrial machines must be sealed together. For example, an exhaust plenum and a cylindrical exhaust duct of a gas turbine are two components that must be sealed together. Flex seals are oftentimes used to seal such components. Flex seals include a first end fixedly mounted to the cylindrical exhaust duct and a second end fixedly mounted to the exhaust plenum. The flex seals flex to accommodate axial and radial movement caused by motion of the turbine and/or thermal expansion of the duct and the plenum. Flex seals can experience high bending stresses and high temperature issues, e.g., gas turbine exhaust can reach temperatures of 649-676° C. (1200-1250° F.). Over time, flex seals relax and are susceptible to cracking and wear from frictional interaction with the respective mounts on the exhaust duct and the exhaust plenum.

BRIEF DESCRIPTION

All aspects, examples and features mentioned below can be combined in any technically possible way.

An aspect of the disclosure provides a seal system for sealing a first component with a second component, the seal system comprising: a plurality of layers of abutting planar seal segments, wherein each of the plurality of layers of abutting planar seal segments includes a first end and a second end, the first ends of the plurality of abutting planar seal segments configured to be positioned in a slot in the first component; a first seal element in the slot in the first component configured to slidably seal against a surface of at least one of the plurality of layers of abutting planar seal segments; a second seal element on a surface of the second component and configured to slidably seal against the surface by engagement with the second end of at least one of the plurality of layers of abutting planar seal segments; a first member extending from a plurality of planar seal segments of a selected one of the plurality of layers of abutting planar seal segments, wherein the selected one of the plurality of layers of abutting planar seal segments engages the at least one of the plurality of layers of abutting planar seal segments having the second end engaging the second seal element; a tension cable engaging the first members; and a tensioner coupled to at least one end of the tension cable and configured to apply a tension force on the tension cable to force the at least one of the plurality of layers of abutting planar seal segments having the second end engaging the second seal element to slidably seal the second seal element with the surface of the second component.

Another aspect of the disclosure includes any of the preceding aspects, and the tensioner includes a first tensioner coupled to a first end of the tension cable and a second tensioner coupled to a second end of the tension cable.

Another aspect of the disclosure includes any of the preceding aspects, and at least one of the first tensioner and the second tensioner is selected from a group comprising: a linear actuator and a spring.

Another aspect of the disclosure includes any of the preceding aspects, and each first member includes a pin coupled to and extending at a perpendicular angle relative to a plane of the plurality of planar seal segments of the selected one of the plurality of layers of abutting planar seal segments.

Another aspect of the disclosure includes any of the preceding aspects, and the first members include a flange integral with and extending at a perpendicular angle relative to a plane of each one of the plurality of planar seal segments of the selected one of the plurality of layers of abutting planar seal segments.

Another aspect of the disclosure includes any of the preceding aspects, and the plurality of layers of abutting planar seal segments includes at least three layers of abutting planar seal segments.

Another aspect of the disclosure includes any of the preceding aspects, and the selected one of the plurality of abutting planar seal segments engages the at least one of the plurality of layers of abutting planar seal segments having the second end engaging the second seal element, but the selected one of the plurality of abutting planar seal segments does not engage the second seal element.

Another aspect of the disclosure includes any of the preceding aspects, and at least some of the abutting planar seal segments of the selected one of the plurality of layers of abutting planar seal segments include a second member at the first end thereof configured to engage the first end of at least one other of the plurality of abutting planar seal segments to force the second ends of the at least one other of the plurality of layers of abutting planar seal segments to engage the second seal element.

Another aspect of the disclosure includes any of the preceding aspects, and further comprising a linear guide slot extending through each planar seal segment of the plurality of layers of abutting planar seal segments, and a guide pin within the slot of the first component and extending through the linear guide slot.

Another aspect of the disclosure includes any of the preceding aspects, and the first component and the second component are arranged perpendicularly to one another, and the slot of the first component is circular and the surface of the second component is cylindrical.

Another aspect of the disclosure includes any of the preceding aspects, and the tension cable extends around the second component more than once.

Another aspect of the disclosure includes any of the preceding aspects, and the first component is an exhaust plenum of a gas turbine, and the second component is an exhaust duct of the gas turbine fluidly coupled to the exhaust plenum, wherein the exhaust plenum and the exhaust duct define a hot gas path, and wherein the tensioner is outside of the hot gas path.

An aspect of the disclosure includes a seal system for sealing an exhaust plenum and an exhaust duct of a gas turbine, the seal system comprising: a plurality of layers of abutting planar seal segments, wherein each of the plurality of layers of abutting planar seal segments includes a first end and a second end, the first ends of the plurality of abutting planar seal segments configured to be positioned in a circular slot in the exhaust plenum; a first seal element in the circular slot in the exhaust plenum configured to slidably seal against a surface of at least one of the plurality of layers of abutting planar seal segments; a second seal element on a cylindrical surface of the exhaust duct and configured to slidably seal against the cylindrical surface by engagement with the second end of at least one of the plurality of layers of abutting planar seal segments; a first member extending from each of a plurality of planar seal segments of a selected one of the plurality of layers of abutting planar seal segments, wherein the selected one of the plurality of layers of abutting planar seal segments engages the at least one of the plurality of layers of abutting planar seal segments having the second end engaging the second seal element; a tension cable engaging the first members; and tensioner coupled to at least one end of the tension cable and configured to apply a tension force on the tension cable to force the at least one of the plurality of layers of abutting planar seal segments having the second end engaging the second seal element to slidably seal the second seal element with the cylindrical surface of the exhaust duct.

Another aspect of the disclosure includes any of the preceding aspects, and the tensioner includes a first tensioner coupled to a first end of the tension cable and a second tensioner coupled to a second end of the tension cable.

Another aspect of the disclosure includes any of the preceding aspects, and at least one of the first tensioner and the second tensioner is selected from a group comprising: a linear actuator and a spring.

Another aspect of the disclosure includes any of the preceding aspects, and each first member includes a pin coupled to and extending at a perpendicular angle relative to a plane of the plurality of planar seal segments of the selected one of the plurality of layers of abutting planar seal segments.

Another aspect of the disclosure includes any of the preceding aspects, and the first members include a flange integral with and extending at a perpendicular angle relative to a plane of each one of the plurality of planar seal segments of the selected one of the plurality of layers of abutting planar seal segments.

Another aspect of the disclosure includes any of the preceding aspects, and the plurality of layers of abutting planar seal segments includes at least three layers of abutting planar seal segments.

Another aspect of the disclosure includes any of the preceding aspects, and the selected one of the plurality of abutting planar seal segments engages the at least one of the plurality of layers of abutting planar seal segments having the second end engaging the second seal element, but the selected one of the plurality of abutting planar seal segments does not engage the second seal element.

Another aspect of the disclosure includes any of the preceding aspects, and at least some of the abutting planar seal segments of the selected one of the plurality of layers of abutting planar seal segments include a second member at the first end thereof configured to engage the first end of at least one other of the plurality of abutting planar seal segments to force the second ends of the at least one other of the other plurality of layers of abutting planar seal segments to engage the second seal element.

Another aspect of the disclosure includes any of the preceding aspects, and further comprising a linear guide slot extending through each planar seal segment of the plurality of layers of abutting planar seal segments, and a guide pin within the circular slot of the exhaust plenum and extending through the linear guide slot.

Another aspect of the disclosure includes any of the preceding aspects, and the tension cable extends around the exhaust duct more than once.

Another aspect of the disclosure includes any of the preceding aspects, and the exhaust plenum and the exhaust duct define a hot gas path, and wherein the tensioner is outside of the hot gas path.

An aspect of the disclosure includes a seal system for sealing a cylindrical exhaust duct and an exhaust plenum of a gas turbine, the exhaust plenum including a circular slot arranged to extend radially relative to the cylindrical exhaust duct, the seal system comprising: a first, a second, and a third layer of abutting planar seal segments, the layers are collectively arranged in contact with one another and radially relative to the cylindrical exhaust duct, wherein each of the first, the second, and the third layers includes an outer end and an inner end; a first seal element in the circular slot in the exhaust plenum slidingly sealing against the first layer and the third layer; a second seal element between the inner ends of at least one of the second layer and the third layer and the cylindrical exhaust duct; a tension cable extending around the cylindrical exhaust duct and engaging with one or more members on at least some of the abutting planar seal segments of the first layer, wherein the first layer engages with at least one of the second layer and the third layer; and a tensioner coupled to at least one end of the tension cable and configured to apply a tension force on the tension cable to force the one or more members on the at least some of the abutting planar seal segments of the first layer radially inwardly relative to the cylindrical exhaust duct and force the inner ends of the at least one of the second layer and the third layer to engage the second seal element to slidably seal the second seal element with the cylindrical exhaust duct.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 shows a schematic, side cross-sectional view of a seal system within the view box in FIG. 1, according to embodiments of the disclosure;

FIG. 3 shows a schematic, axial cross-sectional view of a seal system along view line 3-3 in FIG. 1, according to embodiments of the disclosure;

FIG. 4 shows a perspective view of part of a seal system with only some of each layer of abutting seal segments shown, according to embodiments of the disclosure;

FIG. 5 shows an enlarged perspective view of part of a seal system with only some of each layer of abutting seal segments shown near an inner end thereof, according to embodiments of the disclosure;

FIG. 6 shows an enlarged perspective view of part of a seal system with only some of each layer of abutting seal segments shown near an outer end thereof, according to embodiments of the disclosure;

FIG. 7 shows a perspective view of an illustrative seal element, according to embodiments of the disclosure;

FIG. 10 shows a schematic, axial cross-sectional view of a seal system, according to yet other embodiments of the disclosure;

FIG. 11 shows a schematic, axial cross-sectional view of a seal system, according to other embodiments of the disclosure;

FIG. 14 shows an enlarged cross-sectional view of abutting seal segments of a seal system, according to embodiments of the disclosure.

Figure 1:
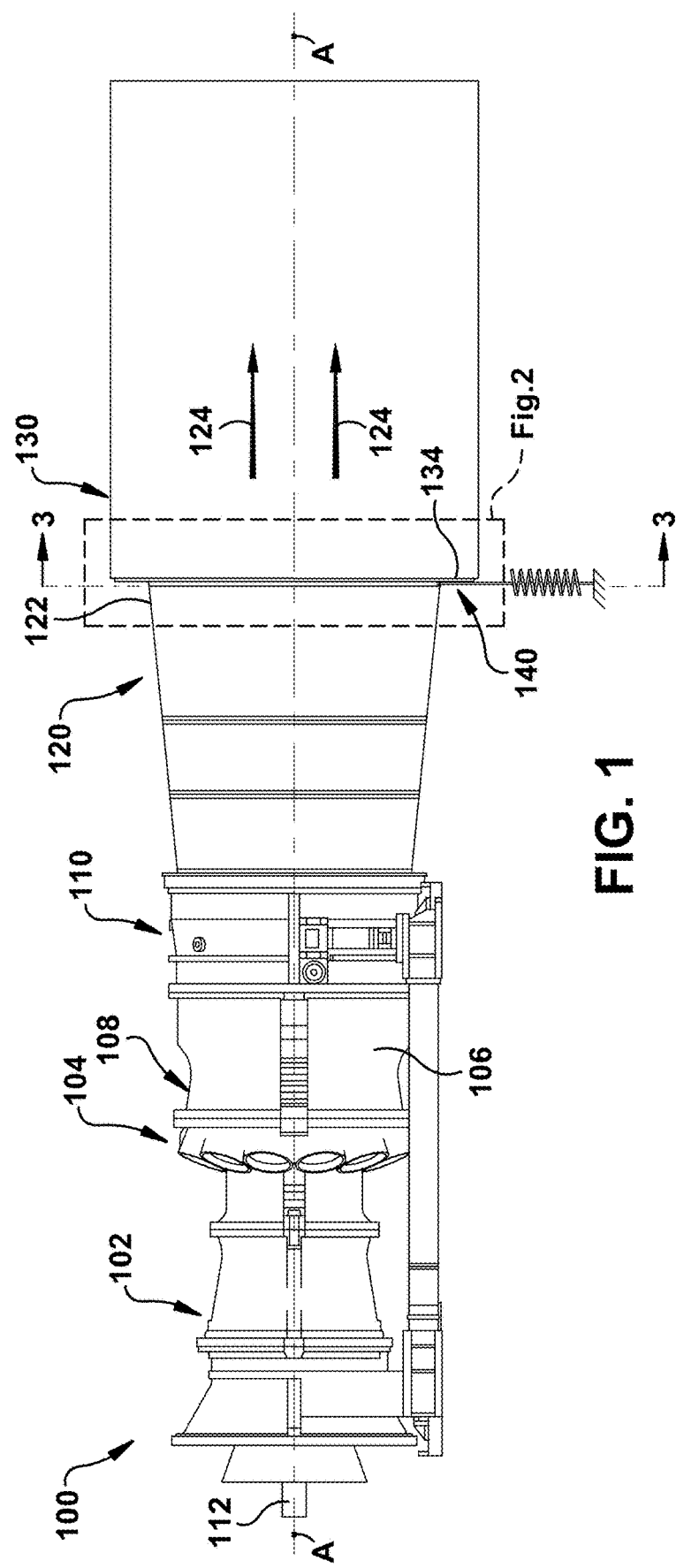
FIG. 1 shows a cross-sectional view of an illustrative industrial machine in the form of a gas turbine system in which embodiments of the disclosure can be used.
Figure 9:
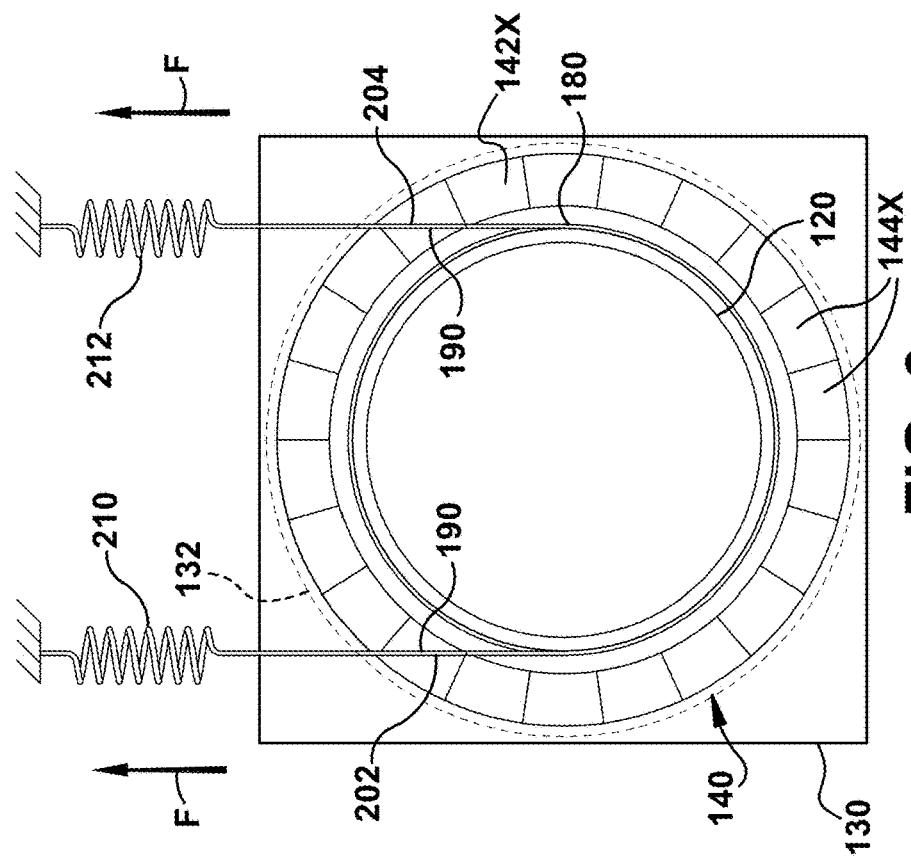
FIG. 9 shows a schematic, axial cross-sectional view of a seal system, according to additional embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of an industrial machine such as a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or abutting terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

It is often required to describe parts that are at different radial positions with regard to a center axis. The term "axial" refers to movement or position parallel to an axis, e.g., an axis of a turbomachine. The term "radial" refers to movement or position perpendicular to an axis, e.g., an axis of a gas turbine system including a cylindrical exhaust duct thereof. In cases such as this, if a first component resides closer to the axis than a second component, it will be stated herein that the first component is "radially inward," "inner" or "inboard" of the second component. If, on the other hand, the first component resides further from the axis than the second component, it may be stated herein that the first component is "radially outward," "outer" or "outboard" of the second component. Finally, the term "circumferential" refers to movement or position around an axis, e.g., a circumferential exterior of a cylindrical exhaust duct of a gas turbine system. As indicated above, it will be appreciated that such terms may be applied in relation to the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a seal system for sealing a first component with a second component, such as an exhaust duct and an exhaust plenum of a gas turbine system. The seal system includes layers of abutting planar seal segments. A first seal element is positioned in a slot in the first component to slidably seal against a surface of the layers, and a second seal element is disposed on a surface of the second component and engages with the second end of the layers. Members extend from seal segments of one of the layers and a tension cable engages the members. A tensioner is coupled to end(s) of the tension cable to apply a tension force on the tension cable to force the seal segments to slidably seal the second seal element with the surface of the second component. The abutting planar seal segments can move freely, perpendicularly and/or parallel to the second component, and can thermally contract/expand as necessary. When employed on a machine having a hot gas path such as a gas turbine system, the tensioner(s) of the seal system do not experience creep/relaxation because the tensioner(s) are out of the hot gas path.

FIG. 1 shows a schematic illustration of an illustrative industrial machine, part of which may include a seal system according to teachings of the disclosure. In the example shown, the industrial machine includes a combustion or gas turbine (GT) system 100, such as a land-based gas turbine used for electrical power generation. GT system 100 includes a compressor 102 and a combustor 104. Combustor 104 includes a combustion region 106 and a fuel nozzle assembly 108. GT system 100 also includes a turbine 110 (e.g., an expansion turbine) and a common compressor/turbine shaft 112 (sometimes referred to as a rotor 112).

In one embodiment, GT system 100 is a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company, and engine models of other companies. Furthermore, the present disclosure is not limited to any particular turbomachine, and may be applicable to, for example, steam turbines, jet engines, compressors, turbofans, etc. The present disclosure may also be applicable to other industrial machines requiring a seal system.

In operation, air flows through compressor 102, and compressed air is supplied to combustor 104. Specifically, compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine 110 in which gas stream thermal energy is converted to mechanical rotational energy. Turbine 110 rotatably couples to and drives rotor 112. Compressor 102 also is rotatably coupled to rotor 112. In the illustrative embodiment, there can be several combustors 106 and fuel nozzle assemblies 108. In an exemplary embodiment, a generator, not shown, may be coupled to and driven by rotor 112 to produce electricity.

GT system 100 may also include an exhaust duct or diffuser 120 fluidly coupled to turbine 110. Exhaust in the form of hot combustion gases exit from turbine 110 and are directed away from turbine by exhaust duct 120. Exhaust duct 120 may have a generally cylindrical external surface 122. More particularly, exhaust duct 120 can be cylindrical or can have some mild enlargement along its axis A so surface 122 is frustoconical (see e.g., FIG. 1). For purposes of description, in most cases, surface 122 is shown cylindrical. It will be recognized that exhaust duct 120 with a somewhat frustoconical external surface 122 would not affect operation of a seal system according to embodiments of the disclosure. An exhaust plenum 130 (first component) couples to exhaust duct 120 (second component) to direct exhaust away from exhaust duct 120, e.g., to atmosphere, a heat recovery steam generator, etc. Exhaust plenum 130 extends around exhaust duct 120 but is not necessarily, and is more than likely, not cylindrical. Duct 120 and plenum 130 are sealingly coupled together by a seal system 140, according to embodiments of the disclosure.

FIG. 2 shows a schematic, side cross-sectional view of seal system 140 from the view box in FIG. 1, and FIG. 3 shows a schematic, axial cross-sectional view of seal system 140 along view line 3-3 in FIG. 1, according to embodiments of the disclosure. As shown in FIG. 2, exhaust plenum 130 has a slot 132 defined in wall 134 thereof. Exhaust plenum 130, or at least wall 134 thereof, and exhaust duct 120 are arranged perpendicular to one another. That is, wall 134 of exhaust plenum 130 and exterior surface 122 of exhaust duct 120 that must be sealed together are generally perpendicular to one another. In the example shown, slot 132 is circular in exhaust plenum 130, and surface 122 of exhaust duct 120 is cylindrical. Other arrangements of slot 132 and surface 122 are also possible. Exhaust plenum 130 and exhaust duct 120 define a hot gas path 124 (FIGS. 1-2) therethrough, i.e., for exhaust from turbine 110.

Seal system 140 seals a first component, e.g., exhaust plenum 130, with a second component, e.g., exhaust duct 120. Seal system 140 may include a plurality of layers 142 of abutting planar seal segments 144. FIG. 4 shows a perspective view of part of seal system 140 with only some of each layer 142 of abutting seal segments 144 shown, FIG. 5 shows an enlarged perspective view of part of seal system 140 with only some of each layer 142 of abutting seal segments 144 shown near inner end 152 thereof, and FIG. 6 shows an enlarged perspective view of part of seal system 144 with only some of each layer 142 of abutting seal segments 144 shown near outer end 150 thereof.

In certain embodiments, at least three layers 142 are used. In the example shown, three layers 142A, 142B, 142C are provided. However, as few as two and more than three layers, collectively referenced as 142, may be provided. Each layer 142 is positioned adjacent and contacting at least one adjacent layer 142, and layers 142 extend in the same plane, e.g., relative to an axis of cylindrical exhaust duct 120. For example, layer 142A is against one side of layer 142B, and layer 142C is against an opposing side of layer 142B.

Each layer 142 of abutting planar seal segments 144 includes a first, outer end 150 and a second, inner end 152. Outer ends 150 are illustrated as radially outer ends closest to exhaust plenum 130, and inner ends 152 are illustrated as radially inner ends closest to exhaust duct 120, i.e., "inner" and "outer" are defined relative to axis A of exhaust duct 120. Note, axis A (FIGS. 1 and 3) may also be, but is not necessarily, the same axis as that of turbine 110. For purposes of description, the seal segments will be collectively referenced as 144, and those within a given layer 142A, 142B, 142C may be referenced with the same letter as the layer in which located, i.e., seal segments in layer 142A may be referenced as seal segments 144A, those in layer 142B as seal segments 144B, and so on. Seal segments 144A, 144B, 144C may be arranged to abut adjacent seals segments on circumferential ends thereof within a respective layer 142A, 142B, 142C along a scam 146 (FIGS. 3-4). That is, seal segments 144A, 144B, 144C abut one another along seams 146 within a respective layer 142A, 142B, 142C. Seams 146 between seal segments 144 within a given layer 142 are interleaved (i.e., arranged so as to not overlap) with seams 146 in an adjacent layer, so as to prevent fluid communication through layers 142.

Planar seal segments 144 each include a mostly planar metal sheet. Any number of planar seal segments 144 may be used within a given layer 142. Each seal segment 144 may extend circumferentially about exhaust duct 120 to an extent dictated by the number of seal segments 144 used. More particularly, each seal segment 144 may extend circumferentially X degrees about exhaust duct 120, where X=360 divided by the number of seal segments 144 in a given layer 142. Layers 142 do not need to have the same number of seal segments 144. Seal segments 144 may expand radially as necessary to ensure seam 146 (FIGS. 3-4) is maintained along their radial extent, e.g., they may expand like a fan or pieces of a pie. The metal sheet may be made of any metal capable of withstanding the stresses and operational environment in which employed. In terms of GT system 100, the metal must be able to withstand the high temperatures of the exhaust from turbine 110, i.e., 649-676° C. (1200-1250° F.).

As shown in FIG. 3, seal segments 144 may optionally have inner ends 152 that are concavely curved so as to follow a contour of exterior surface 122 of exhaust duct 120, which is generally outwardly cylindrical but may have some out-of-circular deformation, e.g., due to thermal stress or vibratory motion of turbine 110. Seal segments 144 may optionally have outer ends 150 that are convexly curved so as to follow a contour of slot 132 in exhaust plenum 130. Slot 132 may be generally circular but may have some out-of-circular deformation, e.g., due to thermal stress or vibratory motion of turbine 110. Alternatively, outer ends 150 and/or inner ends 152 may be linear, e.g., where a sufficient number of segments 144 exist in a given layer 142 that curvature at ends 150 and/or 152 is not necessary.

FIG. 4 shows a perspective view of part of seal system 140 with only some of each layer 142A-C shown, FIG. 5 shows an enlarged perspective view of part of seal system 140 with only some of each layer 142A-C shown near inner end 152, and FIG. 6 shows an enlarged perspective view of part of seal system 140 with only some of each layer 142A-C shown near outer end 150. Outer ends 150 of abutting planar seal segments 144 are configured to be positioned in slot 132 in exhaust plenum 130. Slot 132 can have any radial extent R necessary for outer ends 150 of layers 142 to remain in exhaust plenum 130 during radial motion or thermal expansion of layers 142.

Seal system 140 includes a first seal element 160 in slot 132 in exhaust plenum 130, i.e., in wall 134 of exhaust plenum 130 to extend into slot 132. First seal element 160 is configured to slidably seal against a surface 162 of at least one of layers 142 of abutting planar seal segments 144. First seal element 160 may include any number of radial locations relative to slot 132, i.e., in exhaust plenum 130, to ensure sealing against outer ends 150 of layer(s) 142. In the example shown in FIG. 2, first seal elements 160 are present in slot 132 in two radially spaced locations on an axially upstream surface 162U of layer 142A and in two radially spaced locations on an axially downstream surface 162D of layer 142C. In the example shown in FIG. 6, first seal elements 160 are present in slot 132 on axially upstream surface 162U of layer 142A at one location and on axially downstream surface 162D of layer 142C at one location. The location(s) of first seal elements 160 along upstream surface 162U may be radially aligned (as shown) with the location(s) of first seal elements 160 along downstream surface 162D, or first seal element(s) 160 may be radially offset from upstream surface 162U to downstream surface 162D. Other locations of first seal element 160 are also possible.

Seal system 140 also includes a second seal element 170 on exterior surface 122 of exhaust duct 120. Second seal element 170 is configured to slidably seal against surface 122 by engaging inner end 152 of at least one of layers 142 of abutting planar seal segments 144. Second seal element 170 may include one or more seal element sections 172. In the FIG. 2 example, two seal element sections 172 are used, and in the FIGS. 4-5 examples, a single seal element section 172 is used. Details of arrangements of inner ends 152 of layers 142 and second seal element 170 will be described further herein.

First seal element 160 and second seal element 170 may include any now known or later developed seal materials for slidably sealing against metal surfaces in a high temperature environment. More particularly, first seal element 160 can seal against metal surfaces such that outer ends 150 of layers 142 can slide (radially inward or outward relative to an axis A of exhaust duct 120) within slot 132 of exhaust plenum 130 under kinetic motion or thermal expansion forces and remain sealed. Similarly, second seal element 170 can seal against metal surfaces such that inner ends 152 of at least some of seal segments 144 of at least some of layers 142 can slide (axially) relative to surface 122 of exhaust duct 120 under kinetic motion or thermal expansion forces and remain sealed. In one non-limiting example, seals 160, 170 may include any industrial, high temperature, braided gasket or wire rope, which are typically made of heat or fire-resistant material layers such as fiberglass and/or stainless steel.

Seal system 140 also includes a first member 180 extending from a plurality of planar seal segments 144X of a selected one of plurality of layers 142X of abutting planar seal segments (hereafter referred to as the "selected layer 142X"). As will be further described, first members 180 are engaged by a tension cable 190. Selected layer 142X having first members 180 can include an axially outermost one of layers 142 of abutting planar seal segments 144. In the example shown, the selected layer 142X is an upstream-most layer 142A. Alternatively, the selected layer 142X could also be a downstream-most layer, e.g., layer 142C where three layers 142 are used. Further details regarding the relationship of selected layer 142X and other layers 142B-C and second seal element 170 will be described herein.

Seal system 140 also includes a tension cable 190 engaging first members 180. More particularly, tension cable 190 extends around first members 180 and around exhaust duct 120. In FIG. 3, tension cable 190 is shown extending around exhaust duct 120 and first members 180 once. However, tension cable 190 can extend around exhaust duct 120 (second component) more than once. For example, in FIG. 4, tension cable 190 is shown extending around exhaust duct 120 twice; and in FIG. 5, tension cable 190 is shown extending around exhaust duct 120 thrice. Tension cable 190 may also extend around first members 180 and exhaust duct 120 more than three times. Tension cable 190 can include any length of material having sufficient strength to pull first members 180 and layers 142, via selected layer 142X, to slidingly seal second seal element 170 against surface 122 of exhaust duct 120. For example, tension cable 190 may include a braided metal cable or a single strand metal wire.

As shown in FIGS. 1 and 3, seal system 140 also includes a tensioner 200 coupled to at least one end 202, 204 of tension cable 190. Tensioner 200 is configured to apply a tension force F on tension cable 190. Tension force F forces at least one of layers 142B, 142C of abutting planar seal segments 144B, 144C having inner end 152 engaging second seal element 170 to slidably seal second seal element 170 with surface 122 of exhaust duct 120 (second component). In certain embodiments, as shown in FIG. 3, tensioner 200 includes a first tensioner 210 coupled to first end 202 of tension cable 190 and a second tensioner 212 coupled to second end 204 of tension cable 190. In FIG. 3, both tensioners 210, 212 are vertically below exhaust duct 120 and exhaust plenum 130.

Figure 8:
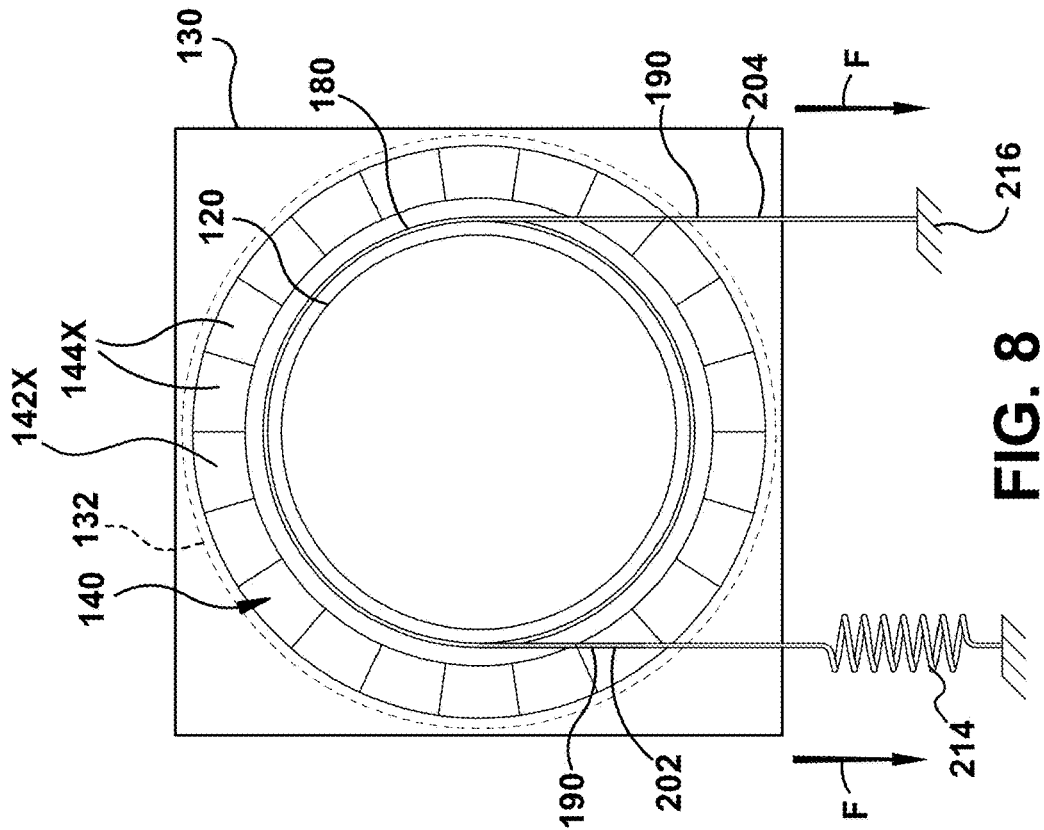
FIG. 8 shows a schematic, axial cross-sectional view of a seal system, according to other embodiments of the disclosure.

FIGS. 8-11 show schematic, axial cross-sectional views of seal system 140 including arrangements of tensioner(s) 200 and tension cable 190, according to other embodiments of the disclosure. In FIG. 8, tensioner 200 includes a single tensioner 214 coupled to first end 202 of tension cable 190, and second end 204 of tension cable 190 is fixed to an immovable base 216, e.g., a building floor or foundation. While tensioner 200 is shown as being positioned below exhaust duct 120 and exhaust plenum 130 such that ends 202, 204 of tension cable 190 extend downwardly from exhaust duct 120, it will be recognized that tension cable 190 can extend away from exhaust duct 120, and from first members 180 of selected layer 142X, in any direction. For example, ends 202, 204 of tension cable 190 can both extend vertically upwardly as in FIG. 9, both horizontally as in FIG. 10, or in a combination of vertically and horizontally as in FIG. 11. Other arrangements may also be possible based on, for example, locations where tensioners 200, 210, 212, 214 can be anchored. In addition, more than one tension cable 190 can also be used, each with its own tensioner(s) 200.

Tensioner(s) 200, 210, 212, 214 may include any now known or later developed mechanism for applying a tensile force F on tension cable 190, such as but not limited to: a spring or a linear actuator (hydraulic ram, pneumatic piston, etc.). For example, in FIG. 3, at least one of first tensioner 210 and second tensioner 214 may include a linear actuator or a spring. Tensioner(s) 200, 210, 212, 214 can have dynamic operation, like springs or computer controlled linear actuators, or can have fixed operation, like a hand-operated winch with a ratchet (come-a-long). In contrast to conventional methods of sealing between exhaust duct 120 and exhaust plenum 130, e.g., with flex seals, tensioner(s) 200, 210, 212, 214 are outside of hot gas path 124 (FIG. 3), which reduces thermal stress experienced by the tensioner(s).

With further regard to first members 180 and selected layer 142X, each first member 180 may include any structural feature which can be engaged by tension cable 190 to pull segments 144X of selected layer 142X toward surface 122 of exhaust duct 120 to slidingly seal second seal element 170 against surface 122. In FIG. 2, first members 180 each include a flange 182 integral with and extending at a generally perpendicular angle relative to a plane of each one of a plurality of planar seal segments 144X of selected layer 142X. Flange 182 can take any shape that can retain tension cable 190 thereon, e.g., cup shaped. In contrast, in FIGS. 4 and 5, each first member 180 includes a pin 184 coupled to and extending at a generally perpendicular angle relative to a plane of a plurality of planar seal segments 144X of selected layer 142X of abutting planar seal segments 144. Pins 184 are affixed to, or integral with, a plurality of planar seal segments 144X of selected layer 142X to generally uniformly distribute tension force F on pins 184, but they need not be on all seal segments 144X of selected layer 142X. Pins 184 may optionally have any structure configured to retain tension cable(s) 190 thereon. In one example, pins 184 may have a round pin head, although other shapes may be used. In one example, pins 184 may optionally have a surface 186 (FIG. 5), e.g., a concave surface, configured to retain tension cable(s) 190 thereon. First members 180 can extend from any plurality of planar seal segments 144X of selected layer 142X necessary to, for example, uniformly apply radially inward force, i.e., tension force F, by tension cable 190 without damaging selected layer 142X, an adjacent layer 142, tension cable 190 or any structure between first members 180 and surface 122 of exhaust duct 120.

In certain embodiments, selected layer 142X having tension cable 190 on first members 180 thereof engages at least one other of layers 142B, 142C that have inner end 152 thereof engaging second seal element 170. That is, selected layer 142X with abutting planar seal segments 144X (having first members 180) engages at least one other layer 142B, 142C of abutting planar seal segments 144B, C that have inner ends 152 thereof engaged with second seal element 170. In certain embodiments, as shown in FIGS. 3 and 5, selected layer 142X of abutting planar seal segments 144X does not engage second seal element 170, i.e., it does not directly contact second seal element 170.

Figure 12:
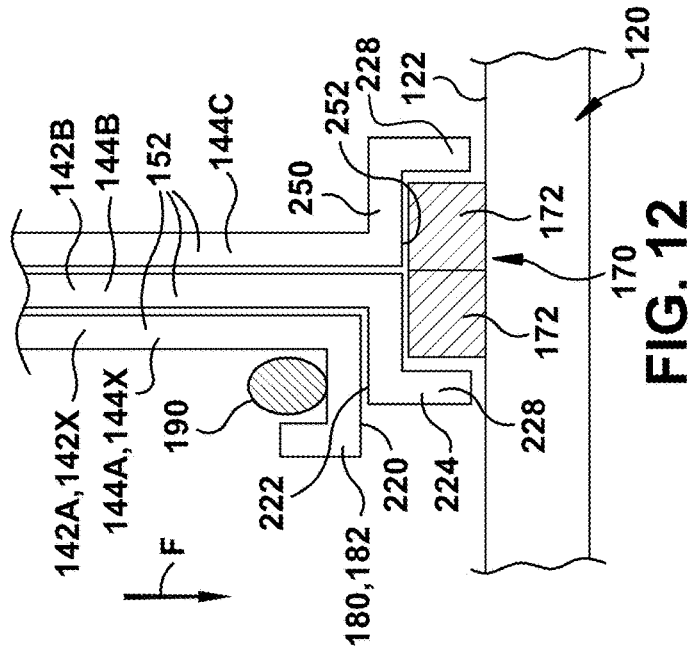
FIG. 12 shows an enlarged cross-sectional view of an inner end of abutting seal segments of a seal system, according to embodiments of the disclosure.

FIG. 12 shows an enlarged view of inner ends 152 of layers 142A-C in FIG. 3. In FIGS. 3 and 12, selected layer 142X having first members 180 (i.e., flanges 182) engages second layer 142B that has inner end 152 thereof engaged with second seal element 170. More particularly, a radially inward facing surface 220 at inner end 152 of selected layer 142X, e.g., of first member 180 (flange 182), engages a radially outward facing surface 222 on a flange 224 extending perpendicular to a plane of planar segments 144B of second layer 142B. A radially inward facing surface 226 of flange 224 on inner end 152 of second layer 142B engages second seal element 170. Thus, tension force F applied by selected layer 142X may direct second layer 142B to engage (e.g., compress against) second seal element 170 and slidingly seal against surface 122 of exhaust duct 120.

Figure 13:
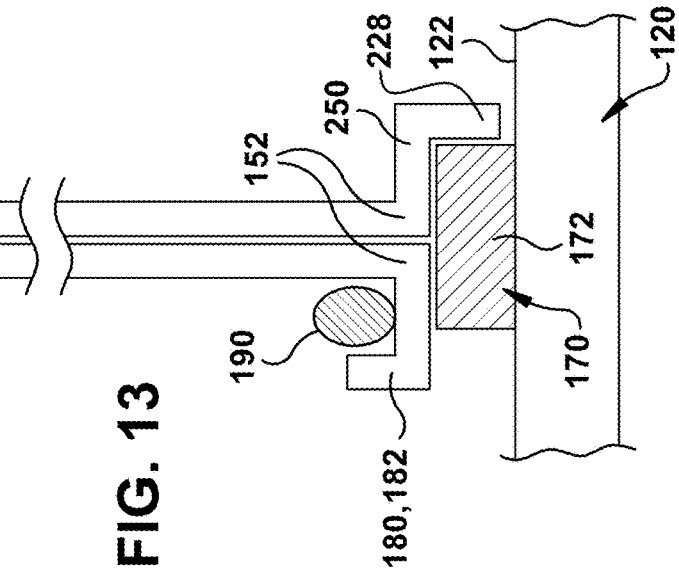
FIG. 13 shows an enlarged cross-sectional view of abutting seal segments of a seal system, according to other embodiments of the disclosure.

FIGS. 13 and 14 show enlarged cross-sectional views of abutting seal segments of a seal system, according to other embodiments of the disclosure. In certain embodiments, shown in FIGS. 3, 13 and 14, at least some of abutting planar seal segments 144X of selected layer 142X may include a second member 240 at outer end 150 thereof (in slot 132 in exhaust plenum 130) configured to engage outer end 150 of at least one other of plurality of abutting planar seal segments 144B, 144C to force inner ends 152 of the other layers 142B, 142C to engage second seal element 170. Second member 240 may include, for example, a flange 242 extending perpendicularly from at least some of seal segments 144X of selected layer 142X. Flanges 242 of second members 240 extend in an opposite axial direction to flanges 182 (or pins 184 where used) of first members 180.

Second members 240 can extend from any plurality of planar seal segments 144X of selected layer 142X necessary to, for example, ensure a uniform application of tension force F, e.g., radially inward tension force, by tension cable 190 without damaging selected layer 142X, an adjacent layer 142, tension cable 190 or any structure between first members 180 and surface 122 of exhaust duct 120. First and second members 180, 240 may be on the same or different seal segments 144. In any event, as selected layer 142X is pulled inwardly towards surface 122 of exhaust duct 120, flange 242 (where provided) forces layers 142B, 142C to engage second seal element 170 to slidingly seal against surface 122 of exhaust duct 120. Second member 240 can take a variety of other forms, e.g., pins like pins 184 or other structure capable of engaging outer ends 152 of layers 142B, 142C.

As shown in FIGS. 3 and 12, third layer 142C may include a flange 250 extending perpendicularly to a plane of seal segments 144C thereof. Flange 250 may include a radially inward facing surface 252 that engages second seal element 170. Thus, tension force F applied by selected layer 142X via second member 240 (flange 242) (FIG. 3) may also direct third layer 142C to engage second seal element 170 to slidingly seal against surface 122 of exhaust duct 120.

In any embodiment described herein, inner ends 152 of those seal segments, e.g., 144B-C in FIGS. 3 and 12, that engage second seal element 170 may optionally include structure(s) to retain second seal element 170 between inner ends 152 and surface 122. In the examples shown in FIGS. 3 and 12, inner ends 152 may include retention elements 228 such as bends or extensions in flanges 224, 250 that limit axial movement of second seal element 170. Retention elements 228 may not be necessary in all cases, e.g., where tension force F alone is sufficient to retain second seal element 170 between inner ends 152 and surface 122 of exhaust duct 120.

Inner ends 152 of layers 142 of seal segments 144 can take a variety of alternative forms. FIGS. 13-14 show schematic views of a variety of alternative embodiments.

In FIG. 13, only two layers 142A, 142B of seal segments 144A, 144B are provided. Selected layer 142X (e.g., layer 142A) includes first members 180 (flanges 182) and second members 240 (flanges 242) on at least some seal segments 144X. Selected layer 142X, via flange 182, may engage second seal element 170 to seal against surface 122 of exhaust duct 170. Only one retaining element 228 is used on seal segments 144B in this example.

In FIG. 14, more than three layers 142A-E (e.g., five) are provided. Selected layer 142X includes first members 180 (pins 184) and second members 240 (flanges 242) on at least some seal segments 144X thereof. Selected layer 142X, via pins 184, engages second layer 142B (not second seal element 170) to force inner ends 152 of second layer 142B to engage second seal element 170 to seal against surface 122 of exhaust duct 170. Downstream-most (fifth) layer 142E includes flange 250 to engage second seal element 170 under tension force F from flange 242 of selected layer 142X. Layers 142C, 142D include seal segments 144C, 144D that are planar and have outer ends 150 thereof engaged by flange 240 on selected layer 142X to force inner ends 152 of layers 142C-D to engage second seal element 170 to seal against surface 122 of exhaust duct 170. Any number of planar layers 142C-D may be provided to provide more axially overlapping layers 142 of seal segments 144 for axial sealing between an area within and without exhaust plenum 130.

Referring again to FIG. 2, in certain embodiments, a linear guide slot 260 may optionally extend through each planar seal segment 144 of plurality of layers 142 of abutting planar seal segments 144, and a guide pin 262 may be positioned within linear guide slot 260 of exhaust plenum 130 (first component) and extend through linear guide slot 260. Guide pin 262 may be fastened to or within wall 134 of exhaust plenum 130. Linear guide slot 260 and pin 262 ensure those seal segments 144 where they are provided move along a desired path dictated by linear guide slot 260, e.g., generally radially.

With further regard to FIG. 2, embodiments of the disclosure also include seal system 140 for sealing cylindrical exhaust duct 120 and exhaust plenum 130 of gas turbine 110. Exhaust plenum 130 includes circular slot 132 arranged to extend radially relative to cylindrical exhaust duct 120. Seal system 140 includes first, second and third layers 142A-C of abutting planar seal segments 144A-C. Layers 142 are arranged in contact with one another as described herein. Layers 142 are collectively arranged radially relative to cylindrical exhaust duct 120, i.e., relative to axis A thereof. First, second and third layers 142A-C each include outer end 150 and inner end 152.

Seal system 140 includes first seal element 160 in circular slot 132 in exhaust plenum 130, i.e., in wall 134, for slidingly sealing against first layer 142A and third layer 142C. Seal system 140 also includes second seal element 170 between inner ends 152 of at least one of second layer 142B and third layer 142C and cylindrical exhaust duct 120.

Seal system 140 also includes tension cable 190 extending around cylindrical exhaust duct 120 and engaging with one or more members 180 (e.g., flanges 182 or pins 184) on at least some of abutting planar seal segments 144A of first layer 142A. First layer 142A engages with at least one of second layer 142B and third layer 142C, e.g., via surfaces 220, 222 (FIG. 12).

As shown in FIGS. 3 and 8-11, tensioner 200, 210, 212, 214 is coupled to at least one end 202, 204 of tension cable 190 and is configured to apply tension force F on tension cable 190 to force the one or more first members 180 on at least some of abutting planar seal segments 144A of first layer 142A radially inwardly relative to cylindrical exhaust duct 120 and force inner ends 152 of at least one of second layer 142B and third layer 142C to engage second seal element 170 to slidably seal second seal element 170 with cylindrical exhaust duct 120.

Embodiments of the disclosure provide various technical and commercial advantages, examples of which are discussed herein. The seal system can seal the components and compensate for large axial and radial relative motion, thereby maintaining good sealing capability. The seal system can also seal against a component that is not perfectly cylindrical, e.g., where the exhaust duct has some deformities due to thermal stress, etc. The seal system can be used on very large cylindrical diameters. The segmentation of layers allows the seal system to self-adjust to a sealed cylindrically shaped component, such as the exhaust duct described herein. With the tensioner(s) provided outside of the hot gas path, and unlike conventional flex seals, the seal system is not subjected to difficult-to-adjust loss of preload due to creep/relaxation. The seal system is also not subjected to high stress, which reduces expected deformation and increases the longevity of the seal system.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A seal system for sealing a first component with a second component, the seal system comprising:
   a plurality of layers of abutting planar seal segments, wherein each of the plurality of layers of abutting planar seal segments includes a first end and a second end, the first ends of the plurality of abutting planar seal segments configured to be positioned in a slot in the first component;
   a first seal element in the slot in the first component configured to slidably seal against a surface of at least one of the plurality of layers of abutting planar seal segments;
   a second seal element on a surface of the second component and configured to slidably seal against the surface by engagement with the second end of at least one of the plurality of layers of abutting planar seal segments;
   a first member extending from a plurality of seal segments of a selected one of the plurality of layers of abutting planar seal segments, wherein the selected one of the plurality of layers of abutting planar seal segments engages the at least one of the plurality of layers of abutting planar seal segments having the second end engaging the second seal element;
   a tension cable engaging the first members; and
   a tensioner coupled to at least one end of the tension cable and configured to apply a tension force on the tension cable to force the at least one of the plurality of layers of abutting planar seal segments having the second end engaging the second seal element to slidably seal the second seal element with the surface of the second component.

2. The seal system of claim 1, wherein the tensioner includes a first tensioner coupled to a first end of the tension cable and a second tensioner coupled to a second end of the tension cable.

3. The seal system of claim 2, wherein at least one of the first tensioner and the second tensioner is selected from a group comprising: a linear actuator and a spring.

4. The seal system of claim 1, wherein each first member includes a pin coupled to and extending at a perpendicular angle relative to a plane of the plurality of seal segments of the selected one of the plurality of layers of abutting planar seal segments.

5. The seal system of claim 1, wherein the first members include a flange integral with and extending at a perpendicular angle relative to a plane of each one of the plurality of planar seal segments of the selected one of the plurality of layers of abutting planar seal segments.

6. The seal system of claim 1, wherein the plurality of layers of abutting planar seal segments includes at least three layers of abutting planar seal segments.

7. The seal system of claim 6, wherein the selected one of the plurality of abutting planar seal segments engages the at least one of the plurality of layers of abutting planar seal segments having the second end engaging the second seal element, but the selected one of the plurality of abutting planar seal segments does not engage the second seal element.

8. The seal system of claim 6, wherein at least some of the abutting planar seal segments of the selected one of the plurality of layers of abutting planar seal segments include a second member at the first end thereof configured to engage the first end of at least one other of the plurality of abutting planar seal segments to force the second ends of the at least one other of the plurality of layers of abutting planar seal segments to engage the second seal element.

9. The seal system of claim 6, further comprising a linear guide slot extending through each planar seal segment of the plurality of layers of abutting planar seal segments, and a guide pin within the slot of the first component and extending through the linear guide slot.

10. The seal system of claim 1, wherein the first component and the second component are arranged perpendicular to one another, and the slot of the first component is circular and the surface of the second component is cylindrical.

11. The seal system of claim 10, wherein the tension cable extends around the second component more than once.

12. The seal system of claim 1, wherein the first component is an exhaust plenum of a gas turbine and the second component is an exhaust duct of the gas turbine fluidly coupled to the exhaust plenum, wherein the exhaust plenum and the exhaust duct define a hot gas path, and wherein the tensioner is outside of the hot gas path.

13. A seal system for sealing an exhaust plenum and an exhaust duct of a gas turbine, the seal system comprising:
   a plurality of layers of abutting planar seal segments, wherein each of the plurality of layers of abutting planar seal segments includes a first end and a second end, the first ends of the plurality of abutting planar seal segments configured to be positioned in a circular slot in the exhaust plenum;
   a first seal element in the circular slot in the exhaust plenum configured to slidably seal against a surface of at least one of the plurality of layers of abutting planar seal segments;
   a second seal element on a cylindrical surface of the exhaust duct and configured to slidably seal against the cylindrical surface by engagement with the second end of at least one of the plurality of layers of abutting planar seal segments;
   a first member extending from each of a plurality of seal segments of a selected one of the plurality of layers of abutting planar seal segments, wherein the selected one of the plurality of layers of abutting planar seal segments engages the at least one of the plurality of layers of abutting planar seal segments having the second end engaging the second seal element;
   a tension cable engaging the first members; and
   a tensioner coupled to at least one end of the tension cable and configured to apply a tension force on the tension cable to force the at least one of the plurality of layers of abutting planar seal segments having the second end engaging the second seal element to slidably seal the second seal element with the cylindrical surface of the exhaust duct.

14. The seal system of claim 13, wherein the tensioner includes a first tensioner coupled to a first end of the tension cable and a second tensioner coupled to a second end of the tension cable.

15. The seal system of claim 14, wherein at least one of the first tensioner and the second tensioner is selected from a group comprising: a linear actuator and a spring.

\* \* \* \* \*